United States Patent [19]

Wondrazek et al.

[11] Patent Number: 5,080,468
[45] Date of Patent: Jan. 14, 1992

[54] DEVICE FOR LIMITING MAXIMUM RADIATION INTENSITY

[75] Inventors: Fritz Wondrazek, Pfaffenhofen; Andreas Hahn, Sauerlach, both of Fed. Rep. of Germany

[73] Assignee: Messerschmitt-Bölkow-Blohm GmbH, Munich, Fed. Rep. of Germany

[21] Appl. No.: 14,717

[22] Filed: Feb. 13, 1987

[30] Foreign Application Priority Data

Feb. 21, 1986 [DE] Fed. Rep. of Germany ....... 3605635

[51] Int. Cl.⁵ .......................... G02B 5/23; G02B 1/01; G02F 1/00; G01J 1/32
[52] U.S. Cl. ..................................... 359/241; 385/15; 385/33; 250/205
[58] Field of Search ..................... 350/354, 363, 96.15, 350/96.18; 332/7.51; 250/205; 219/121 LA

[56] References Cited

U.S. PATENT DOCUMENTS

| 1,894,042 | 1/1933 | Jenkins | 350/363 |
| 3,433,555 | 3/1969 | Tomlinson | 350/363 |
| 4,464,021 | 9/1984 | Brown et al. | 350/354 |
| 4,597,639 | 7/1986 | Seitel et al. | 350/363 |

FOREIGN PATENT DOCUMENTS 2517019 10/1976 Fed. Rep. of Germany.

Primary Examiner—Eugene R. LaRoche
Assistant Examiner—Michael Shingleton
Attorney, Agent, or Firm—Kenyon & Kenyon

[57] ABSTRACT

For limiting the maximum radiation intensity of a radiation source, in particular a laser, a transparent breakdown cell (4, 10, 17) with defined breakdown threshold value is placed within the ray path of the radiation source (2, 8, 15).

1 Claim, 1 Drawing Sheet

DEVICE FOR LIMITING MAXIMUM RADIATION INTENSITY

BACKGROUND OF THE INVENTION

The present invention relates to a device for limiting the maximum radiation intensity of a radiation source, in particular a laser, as well as a device for coupling high radiation intensity of a radiation source, in particular a pulse laser, to an optic fiber.

Gray filters with different yet definite transparency values are, for example, known for limiting the radiation intensity of radiation sources. In glasses, so-called light-adjusting ("self-tinting") glasses are known, the transparency of which diminishes with increasing intensity of sun light.

The known devices are not suited for limiting the radiation intensity of a radiation source to a certain maximum but allowing lower ones to pass unhindered. Such devices react much too slowly to intensity peaks, so that material damage could occur, especially when lasers are employed as radiation sources. Especially when pulse lasers are used, such excessive intensity increases can originate through spatial (hot spots) and temporal modulation of the laser pulses.

SUMMARY OF THE INVENTION

It is object of the present invention to provide a device for limiting the maximum radiation intensity of a radiation source, in particular of a laser, which, analogous to electric fuses, reacts rapidly and reliably and, in this way, protects the irradiated parts or those exposed to radiation against undue high radiation intensities, and allows the coupling of high medium radiation intensities into optic devices like, for instance, optic fibers.

The above and other objects of the invention are achieved by a device for limiting the maximum radiation intensity of a radiation source, in particular a laser, comprising a transparent breakdown cell with defined breakdown threshold value disposed within the ray path of the radiation source.

According to another aspect, the invention comprises a device for coupling high radiation intensities from a radiation source, in particular a pulse laser, into an optic fiber, comprising a breakdown cell having a breakdown threshold value below the destruction threshold value of the optic fiber disposed between the radiation source and the optic fiber.

The invention utilizes the principle that in the focus of a focused laser beam exceeding material-specific energy densities through multiphoton absorption and cascade ionization creates a plasma which is radio opaque to laser rays (see dissertation by Dipl.-Phys. Jurgen Munschau "Theoretical and Experimental Investigations of the Generation, Propagation, and Application of Laser Induced Shock Waves", TU Berlin 1981, pp. 46). This process is known as the breakdown effect, in which the so-called breakdown threshold value, i.e., the value of the radiation intensity at which plasma generation occurs, is a function of the irradiated medium. This breakdown threshold value for air under atmospheric pressure is approximately $2 \times 10^{14}$ W/m$^2$ and for distilled water $6.4 \times 10^{13}$ W/m$^2$. The breakdown effect in the dissertation mentioned was investigated in connection with the generation of shock waves; technical applications going beyond this investigation are not mentioned.

Such a breakdown cell with defined breakdown threshold value can be used to particular advantage to protect optic fibers when coupling high radiation intensities into them. Especially when using pulse lasers, laser pulses occur with peak intensities which lie above the destruction threshold of the light conductor. Material damage can result from this, particularly in the region of the coupling side of the light conductor. Particularly in those applications in which the laser light is intended as tool in the treatment of material or tissue, such intensity peaks are disruptive, since they may considerably increase the irradiated total intensity.

When using gases as the breakdown medium, the breakdown threshold value can be adjusted advantageously through the gas pressure.

For coupling high radiation intensities into an optic fiber, it has furthermore been shown to be of advantage if the radiation is not in the customary way coupled into the optic fiber while focused but rather while diverging.

In the simplest case, this can be accomplished through a dispersion lens placed directly in front of the frontal surface of the optic fiber or through a concave frontal entering surface of the optic fiber. The angle of aperture for the ray beam entering the optic fiber has been found to have a minimum of 8°. These measures permit the distribution of the pulse energy over several modes when pulse lasers are used, which suppresses local excessive increases in intensity as well as self-focusing. The destruction threshold of the optic fiber is raised, so that in connection with an interposed breakdown cell, high medium radiation intensity and thus radiating power can be conducted through the optic fiber. These provisions can, however, be applied independent of the use of a breakdown cell.

BRIEF DESCRIPTION OF THE DRAWINGS

The invention will be explained in greater detail in the following detailed description with reference to the drawings, in which.

DETAILED DESCRIPTION

Figure 1:
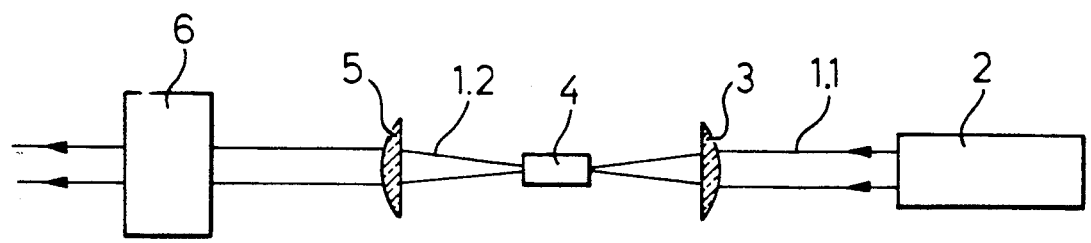
FIG. 1 shows a device for limiting the maximum radiation intensity for the protection of optical equipment.

With reference now to the drawings, in the embodiment shown in FIG. 1, the parallel light beam 1.1 of a laser 2 is focused with a focusing lens 3 onto a breakdown cell 4. The emergent ray beam 1.2 is coupled with additional optics 5 into an optic component 6 of choice and therefore not further described, which is to be protected against an increase above a maximum radiation intensity. The breakdown cell 4 comprises a material highly transparent to the spectral range of the laser, which can be solid state as well as a liquid or a gas.

The breakdown threshold value, that is the value of the radiation intensity at which plasma formation suddenly occurs and the breakdown cell becomes opaque to laser light, is a function of the material and can readily be influenced, especially in the case of gases, through pressure changes. When using gases, the added advantage gained is that the breakdown cell regenerates very rapidly and becomes again transparent. Appropriate choice of the focal length of the focusing lens 3 and the material used makes the switch threshold variable over a wide range. Additional related information, especially information concerning the influence of the optics, can be found in the dissertation mentioned above. Since the damage threshold of optic materials lies in the range of a few $10^{13}$ W/m$^2$, the materials already studied in the dissertation mentioned above, methanol, glycerin, distilled water, and air permit the creation of useful safety devices for optic components against excessively raised radiation intensities.

Because of high switching velocity, which is in the range of nanoseconds, such a device can filter out damaging power peaks, for instance, from laser pulses, so that the selected mean intensity of the individual laser pulses can be higher than has previously been possible without destroying the succeeding optic component in a laser beam with laser pulses of too high an intensity. The life expectancy of optic components protected in such a way is increased drastically.

Figure 2:
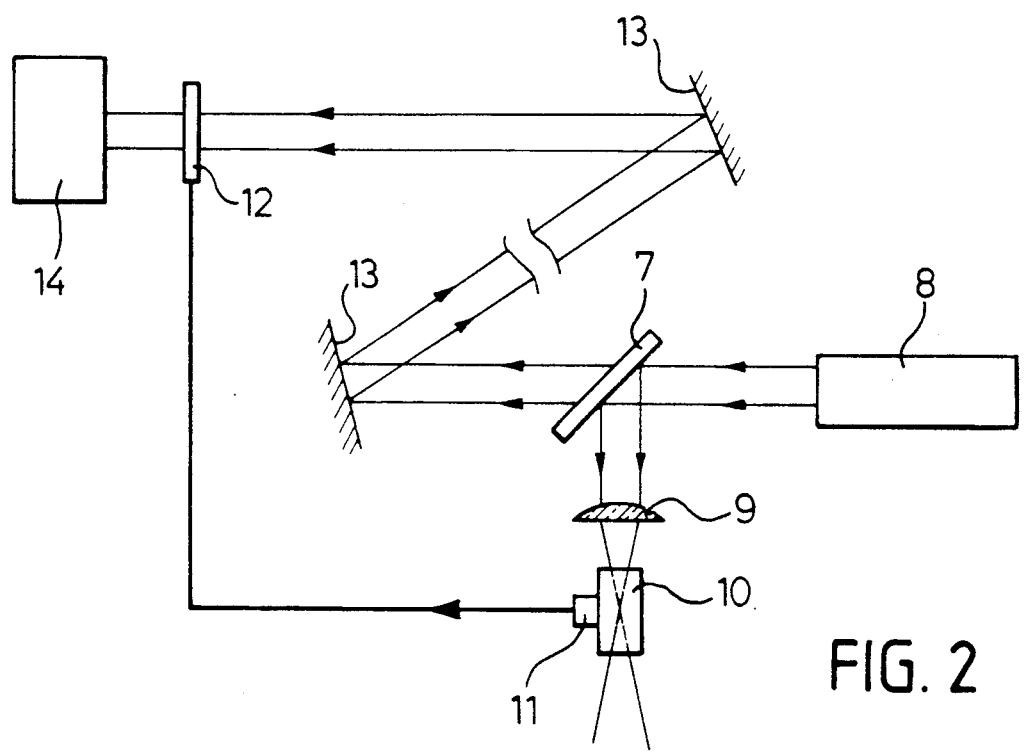
FIG. 2 shows a device according to FIG. 1 with indirectly acting breakdown cell.

FIG. 2 shows a further embodiment of a device for the protection of optic components against undue high radiation intensities, in which a small fraction of the radiation energy of a laser pulse from laser 8 is uncoupled by a ray divider 7 and guided by a focusing lens 9 into a breakdown cell 10. The breakdown threshold value of this breakdown cell 10 is adjusted to the total radiation energy of the laser 8. With an optic or electric detector 11, an optic breakdown is registered, and with a corresponding electric signal, a ray switch 12 is controlled. The ray switch 12 is located between an optic delay path 13 placed after the ray divider 7 and the optic component 14 to be protected, and can be designed as a Kerr cell or as a liquid crystal cell. The advantage of this embodiment, compared to the one shown in FIG. 1, consists of the fact, that no manipulations influencing the beam parameters of the laser (for instance, phase front) need be undertaken.

Figure 3:
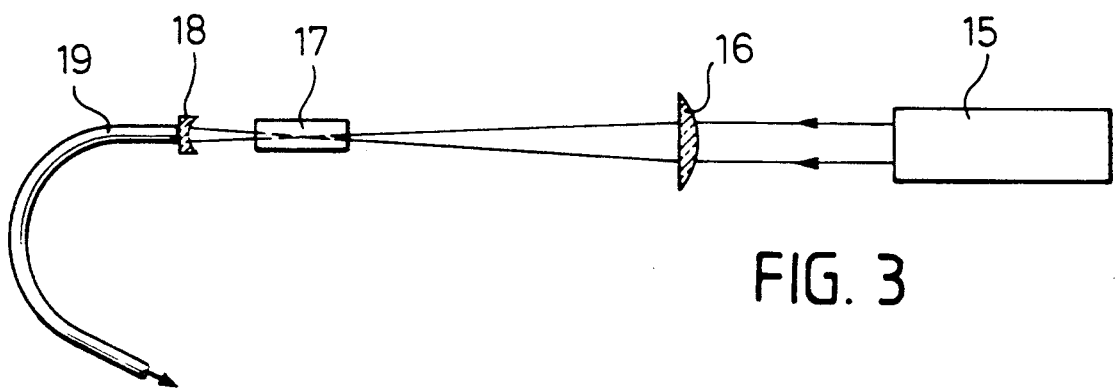
FIG. 3 shows a device for coupling high radiation intensities into an optic fiber.

FIG. 3 shows a device for coupling high radiation intensities into an optic fiber. In it, the radiation of a laser 15 is focused with a focusing lens 16 onto a breakdown cell 17. The emergent radiation is coupled into the optic fiber 19 through a dispersion lens 18. The breakdown cell 17 corresponds to the models described in FIGS. 1 and 2 and protects the optic fiber against intensity peaks, which lie above the destruction threshold of the photo conducting material. The dispersion lens 18 distributes threshold of the radiation energy over several modes, suppressing local excessive intensity increases and self-focusing. The dispersion lens 18 is located immediately at the coupling front surfaces of the optic fiber and is designed in such a way, that the radiation beam incident upon the optic fiber has an angle of aperture of at least 8°. The maximum reflection losses, the interval between the dispersion lens 18, and the optic fiber 19 can be covered in the customary manner or filled with a so-called index matching fluid.

The function of the dispersion lens 18 can also be assumed by an appropriately concave ground or etched frontal surface of the optic fiber.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A device for limiting the maximum radiation intensity of a radiation source, in particular a laser, comprising a transparent breakdown cell having a defined breakdown threshold value disposed within the ray path of the radiation source, further comprising a ray divider disposed in the ray path of the radiation source, said ray divider diverting a part of the radiation to the breakdown cell and still further comprising a ray switch disposed in the ray path, said ray switch being controlled by the breakdown cell.

* * * * *